United States Patent [19]
Kurio et al.

[11] 3,897,956
[45] Aug. 5, 1975

[54] OIL SEAL MEMBER FOR USE IN ROTARY INTERNAL COMBUSTION ENGINE

[75] Inventors: Noriyuki Kurio, Hiroshima; Keiichiro Shin, Ageo, both of Japan

[73] Assignee: Nippon Piston Ring Co., Ltd., Tokyo, Japan

[22] Filed: May 3, 1973

[21] Appl. No.: 357,052

[30] Foreign Application Priority Data
May 6, 1973    Japan............................ 48-053069

[52] U.S. Cl................................. 277/81; 418/142
[51] Int. Cl........................................... F01c 19/02
[58] Field of Search .......... 277/81, 235 A; 418/104, 418/142

[56] References Cited
UNITED STATES PATENTS
3,456,624   7/1969   Hideo Okamoto ................. 418/142

*Primary Examiner*—Richard E. Aegerter
*Assistant Examiner*—Willis Little
*Attorney, Agent, or Firm*—Sughrue, Rothwell, Mion, Zinn & Macpeak

[57] ABSTRACT

Herein desclosed is an improved oil seal member mounted in an oil seal groove which is formed in a side surface of a rotor of a rotary internal combustion engine. The oil seal member has a hardened layer formed in the radially outer peripheral surface. Owing to this hardened layer, the oil seal member can perform sufficient wear resistance even when in considerably contact with the oil seal groove.

5 Claims, 3 Drawing Figures

3,897,956

OIL SEAL MEMBER FOR USE IN ROTARY INTERNAL COMBUSTION ENGINE

BACKGROUND OF THE INVENTION

1. Field of the Invention

The present invention relates to an oil seal member for use in rotary piston internal combustion engine.

2. Description of the Prior Art

An oil seal member is, as is well known in the art, mounted in an oil seal groove which is formed in a side surface of a rotor of a rotary piston internal combustion engine. This oil seal member has two functions, one being prevent oil, which is supplied as a cooling fluid for the rotor, from leaking into the combustion chamber, and the other being to supply a suitable amount of lubricating oil onto the inner wall of this side housing and accordingly provide sufficient slidability thereto. The oil seal member usually has a generally rectangular cross section and is provided at its radially inner peripheral surface with a generally rectangular peripheral groove, in which a rubbery seal member such as an O-ring is received.

In the course of aging of the O-ring, however, there arises a drawback in the conventional oil seal member like this. With the aged O-ring, more specifically, the oil member will move freely in oil seal groove to resultantly invite considerable wear of the radially outer peripheral surface thereof, which is located just opposite to the O-ring. As a result, the sealing effect of the oil seal member is materially reduced to invite such undesirable phenomena as considerable increase in lubricating oil consumption or stick in the side seal member for gas seals.

SUMMARY OF THE INVENTION

It is, therefore, a primary object of the present invention to provide an improved oil seal member which is free of the above drawback and of the accompanying undesirable phenomena.

Another object of the present invention is to provide an improved oil seal member which is provided with a hardened layer in its radially outer peripheral surface providing sufficient wear resistance to the oil seal member even when the latter considerably contact with the side seal groove.

DESCRIPTION OF THE DRAWING

Other objects and advantages of the present invention will be apparent from the following description to be made in conjunction with the accompanying drawing, in which.

DESCRIPTION OF THE PREFERRED EMBODIMENT

Figure 1:
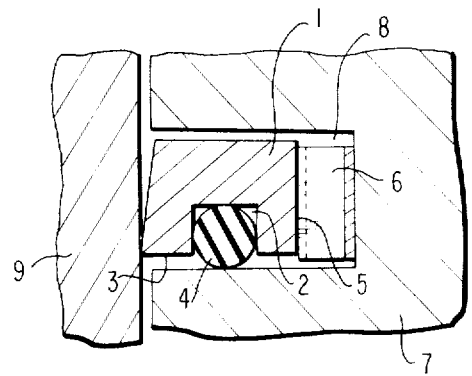
FIG. 1 is a partially enlarged cross-sectional view showing a conventional side seal member together with the side housing and the rotor of a rotary engine.

Referring now to FIG. 1 showing the conventional oil seal construction, indicated at reference numeral 1 is an oil seal member. This oil seal member 1 has a generally rectangular cross section and is formed with a generally rectangular annular groove 2, which is preferably located centrally of the radially inner peripheral surface 3 of the oil seal member 1. In the reactangular groove 2 is received a rubbery seal member 4 or O-ring of silicone rubber or the like. At the axially inner surface 5 of the oil seal member 1, on the other hand, there is disposed spring 6. As shown, in the side surface of a rotor 7 of a rotary piston internal combustion engine, is formed a oil seal groove 8 in which the oil seal member 1, the O-ring 4 and the spring 6 are inserted. With these arrangements, the oil seal member 1 is pushed by the spring 6 toward a side housing 9 of the engine in a manner to have its axially outer surface slidably engage with the inner wall of the engine side housing 9 and at the same time to have the O-ring 4 hermetically engage with the radially inner wall of the side seal groove 8.

Although, in this instance, the O-ring 4 is made of oil resistant material, it is subject to aging after a considerable period of time. Then, the oil seal member 1 will move freely in the oil seal groove 8 so that the radially outer peripheral surface thereof is considerably worn, as has been described.

Figure 2:
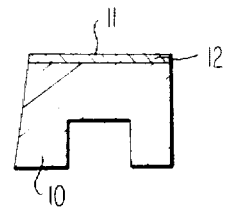
FIG. 2 is an enlarged cross-sectional view showing a oil seal member exemplifying the present invention but taken away from the oil seal groove of the rotor.
Figure 3:
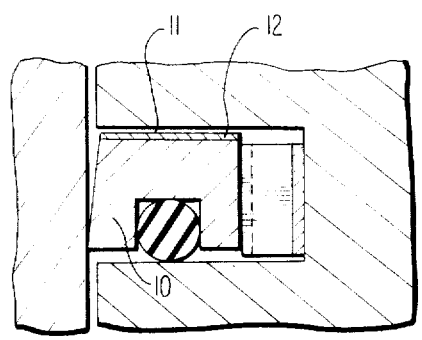
FIG. 3 is similar to FIG. 1 but shows the side seal member of FIG. 2 when it is in use.

In order to obviate this wear problem, the oil seal member 10 of the present invention is provided in the radially outer peripheral surface 11 with a hardened layer 12, as shown in FIGS. 2 and 3. This hardened layer 12 may be selected from any of the methods including the electroplating of chromium, the spray of molybdenum, the nitrification, the heat treatment of the particular surface and the like.

In this way, the wear problem of the radially outer peripheral surface of the oil seal member is materially reduced even when the O-ring considerably is aged. The sealing effect of the oil seal member can, therefore, be maintained at an excellent level for a prolonged time period, so that the undesirable phenomena, which might otherwise adversely affect the particular sealing effect, are markedly eliminated.

What is claimed is:

1. A seal construction for a rotary combustion engine comprising, in combination:
    a housing composed of spaced end walls and an annular wall interconnecting the end walls to form a cavity,
    a rotary piston pivotably mounted within said housing cavity and having axial end faces disposed adjacent to the inner surfaces of said end walls and having a peripheral surface cooperating with the annular wall of the housing to define a plurality of working chambers therebetween,
    an annular groove provided on each end face of the rotary piston,
    an annular sealing ring axially slidably positioned in said annular groove, said sealing ring having an axial outer end face at an angle with the inner face of the end wall with the axial outer and radial inner peripheral edge of the ring pointing towards the inner face of the end wall,
    a generally rectangular groove formed within the radially inner peripheral surface of said ring,
    an annular rubbery O-ring seal member disposed within said rectangular groove within said ring to hermetically seal the radially inner peripheral surface of said ring with the annular oil seal groove receiving the same,
    spring means disposed in said annular groove and urging said annular sealing ring axially outward of said groove so that the axial outer end of the radial inner peripheral edge of the ring engages with the inner surface of the end wall for efficient scraping of oil therefrom;

the improvement comprising:
a hardened layer formed on the radially outer peripheral surface to provide sufficient wear resistivity to said oil seal ring to insure low lubricating oil consumption regardless of superannuation of the oil ring during operation of the engine.

2. A seal construction according to claim 1, wherein said hardened layer is made of electroplated chromium.

3. A seal construction according to claim 1, wherein said hardened layer is made of molybdenum.

4. A seal construction according to claim 1, wherein said hardened layer is nitrified.

5. A seal construction according to claim 1, wherein said hardened layer is heat treated.

* * * * *

UNITED STATES PATENT AND TRADEMARK OFFICE
CERTIFICATE OF CORRECTION

PATENT NO. : 3,897,956
DATED : August 5, 1975
INVENTOR(S) : Noriyuki Kurio and Keiichiro Shin It is certified that error appears in the above−identified patent and that said Letters Patent are hereby corrected as shown below:

On the first page, first column, line [30] in the listing of the Foreign Application Priority Data, please change the date to May 6, 1972, and change the number of the priority document to 47-53069.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*